United States Patent
Christophe et al.

(10) Patent No.: US 8,127,173 B2
(45) Date of Patent: Feb. 28, 2012

(54) DEVICE AND METHOD FOR AUTOMATICALLY DETERMINING A NETWORK ELEMENT FOR REPLACING A FAILING NETWORK ELEMENT

(75) Inventors: Benoit Christophe, Route de Villejust (FR); Fabien Balageas, Route de Villejust (FR)

(73) Assignee: Alcatel Lucent, Paris (FR)

( * ) Notice: Subject to any disclaimer, the term of this patent is extended or adjusted under 35 U.S.C. 154(b) by 216 days.

(21) Appl. No.: 12/553,219

(22) Filed: Sep. 3, 2009

(65) Prior Publication Data
US 2010/0083033 A1 Apr. 1, 2010

(30) Foreign Application Priority Data
Sep. 4, 2008 (EP) .................................... 08305523

(51) Int. Cl.
*G06F 11/00* (2006.01)
(52) U.S. Cl. .................... 714/4.1; 714/4.12; 709/221
(58) Field of Classification Search ............. 714/4.12
See application file for complete search history.

(56) References Cited

U.S. PATENT DOCUMENTS

| | | | | |
|---|---|---|---|---|
| 6,374,293 B1* | 4/2002 | Dev et al. | ............... | 709/220 |
| 6,771,966 B1* | 8/2004 | Chow | ............... | 455/446 |
| 6,993,332 B2* | 1/2006 | Pedersen et al. | ............... | 455/436 |
| 7,395,351 B1 | 7/2008 | Nucci et al. | | |
| 2005/0243723 A1* | 11/2005 | Randriamasy | ............... | 370/235 |
| 2007/0016902 A1* | 1/2007 | Shozaki et al. | ............... | 717/174 |
| 2008/0294418 A1* | 11/2008 | Cleary et al. | ............... | 703/21 |
| 2011/0173487 A1* | 7/2011 | Fujibayashi | ............... | 714/4.1 |

FOREIGN PATENT DOCUMENTS
WO WO2008/067852 A1 6/2008

OTHER PUBLICATIONS

Abar S et al, "Agent-Based Knowledge Acquisition in Network Management Domain," Advanced Information Networking and Applications 2005, AINA 2005, 19T H International Conference on Taipei, Taiwan Mar. 25-30, 2005, Piscataway, NU, USA, IEEE, vol. 1, Mar. 25, 2005, pp. 687-692, XP010789870.
European Search Report.

* cited by examiner

*Primary Examiner* — Robert Beausoliel, Jr.
*Assistant Examiner* — Neil Miles
(74) *Attorney, Agent, or Firm* — Fay Sharpe LLP

(57) ABSTRACT

A device (D), intended for working for at least one network (N), comprises i) an ontology agent (OA) storing at least one ontology defining representations of network elements and relations between these network elements, and ii) a processing means (PM) arranged, when a status of a network element indicates that the latter is failing, for accessing to the ontology agent (OA) to get the representation of the failing network element and relations between this failing network element and at least one other network element, then for determining for each of these other network elements a parameter value representative of a functional likeness with the failing network element from their respective ontology representations, and for determining amongst the other network elements the one offering the parameter value representative of the greatest functional likeness in order to propose to replace the failing network element with this determined network element.

11 Claims, 1 Drawing Sheet

Figure 1:
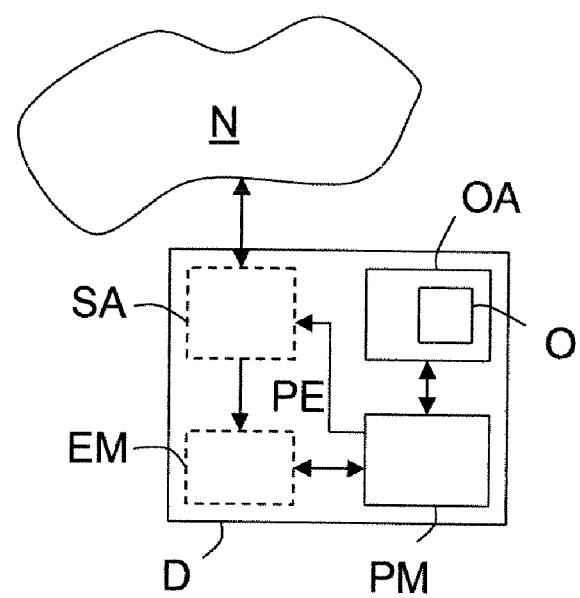

DEVICE AND METHOD FOR AUTOMATICALLY DETERMINING A NETWORK ELEMENT FOR REPLACING A FAILING NETWORK ELEMENT

The present invention relates to network management.

One means here by "network" any type of system comprising elements (or objects or components or else equipments) which are connected directly or indirectly therebetween. So, it can be a computer network or a (tele)communication network or a network comprising different types of equipment (such as computers, printers, scanners, faxes, telephones, switches, software modules), for instance.

When a remote object must be used (or manipulated) through a network, it or one or more network components (or objects) that are needed to perform a task with it may be temporarily broken or unavailable or else impossible to retrieve. In both cases the remote object and/or the network components can not fully work. This may be harmful in some domains such as banking, storage networking, call center or manufacturing factory, for instance. Unfortunately the existing network management tools are not sufficient to smartly solve the above mentioned issue.

Indeed, a first one of the existing network management tools makes use of a Management Information Base (or MIB). It aims at defining an abstract representation of a network like a "tree" of network elements and then at querying this abstract representation (by means of a SNMP protocol, for instance) in order to determine if a network element is going wrong (for instance through received messages such as "element 1.3.2.4 does not respond since 30 seconds"). This first tool allows supervision and physical intervention more rapidly than if there was nothing. So, it allows to get status of a network element but it does not give the relations between network elements and therefore does not allow to smartly (i.e. dynamically and/or efficiently) reorganize a (part of a) network in order to allow a user to switch from the utilization of a bad network component to another one, and in order to potentially avoid a human intervention.

A second one of the existing network management tools makes use of a XML schema (or XSD). It aims at providing an abstract XML representation of all the entities (or elements or components or else objects) that are (or could be) contained in a network. But an abstract XML representation being bound to each underlying network component, there is no way to get the status of an entity (or element or else component). So, XSD allows a program to know a description of each network element but it does not allow a program to have a status of a network element or to obtain relations between several network elements. In other words XSD has to be coupled to another tool that is able to interact with remote objects.

A third one of the existing network management tools makes use of ontology. It is recalled that an "ontology" is a formal description (or data model) of terms (or concepts) that are manipulated within a given domain and of relationships between these terms (or concepts). So, an ontology represents a set of elements (defined by their type (or "class") and their characteristics (or "attributes")) and the relations existing between elements. Ontologies are notably used to reason about the objects that are present within a domain.

This third tool aims at reasoning on at least one ontology (as proposed by Fact++, for instance). It allows a program to query an ontology in order to find some interesting properties of an element contained into this ontology. Using an ontology is may be the strongest way to represent a network because this allows a program to get all the relations between the different elements of a network. But this does not allow a program to get the status of an element and this does not provide functionalities allowing reorganizations of a network. So, this third tool has to be coupled with another network tool to allow reorganization of a network.

A fourth one of the existing network management tools makes use of rule engine. It is closed to the third tool. It aims at associating a set of rules to every element of a network to allow information extraction relative to a network element. This fourth tool presents the same drawbacks as those of the third tool.

A fifth one of the existing network management tools makes use of graph based algorithms arranged for organizing network resources or network use. Such a graph based algorithm is notably described in the IEEE document "A Graph Based Algorithm for Data Path Optimization in Custom Processors". Unfortunately, this kind of algorithm being generally dedicated to a type of objects (for instance processors) it considers all graph nodes like objects having a set of common properties (for instance the number of cycles that a processor has to perform). So, this fifth tool allows a program to know that a network should be reorganized only if it is a network composed of homogeneous objects. Moreover, it is not able to get relations between network elements. Finally, it does not allow network reorganizations.

Moreover, none of the above mentioned tools allows a program to get information about a set of elements, such as "the three following elements could be replace with a fourth element as it is close to them (for instance in terms of characteristics and/or type)".

So, the object of this invention is to improve the situation by allowing an automatic determination of a network element capable of replacing at least one failing network element.

For this purpose, it provides a device, intended for working for at least one network (comprising elements), and comprising:

i) an ontology agent storing at least one ontology defining representations of the network elements and relations between these network elements, and ii) a processing means arranged, when a status of a network element indicates that the latter is failing, for accessing to the ontology agent to get the representation of this failing network element and relations between this failing network element and at least one other network element, then for determining for each of these other network elements a parameter value representative of a functional likeness with the failing network element from their respective ontology representations, and for determining amongst the other network elements the one offering the parameter value which is representative of the greatest functional likeness in order to propose to replace the failing network element with this determined network element.

The device according to the invention may include additional characteristics considered separately or combined, and notably:

its processing means may be arranged, in case where each network element is defined by an ontology representation comprising at least one element property and at least one class "specificity" (such as a "class restriction" or a "class intersection", for instance), for determining a parameter value from a ratio between a first sum of the number of common class specificities between the failing network element and an other network element with the number of common element properties between the failing network element and this other network element, and a second sum of the number of class specificities of the failing network element with the number of element properties of the failing network element;

in a variant its processing means may be arranged, in case where each network element is defined by an ontology representation comprising at least one element property and at least one class specificity for determining a parameter value while taking into account weights associated to the properties and/or the class specificities of the ontology representation of the failing network element and the other network element(s);

its processing means may be arranged for determining the parameter values from a ratio between a first sum of the weights associated to the Bass specificities that are common to the failing network element and an other network element and the weights associated to the element properties that are common to the failing network element and this other network element, and a second sum of the weights associated to the class specificities of the failing network element and the weights associated to the element properties of the failing network element;

it may comprise an interface (or network agent) arranged for querying the network in order to get status of its network elements.

The invention also provides a computer software product comprising a device such as the one above introduced.

The invention also provides a method, intended for automatically determining an element of a network capable of replacing at least one failing network element of this network, and consisting, when a status of a network element indicates that the latter is failing:

i) in determining, into an ontology defining representations of the network elements and relations between these network elements, the representation of the failing network element and the relations between this failing network element and at least one other network element, then ii) in determining for each of these other network elements a parameter value representative of a functional likeness with the failing network element from their respective ontology representations, and iii) in determining amongst the other network elements the one offering the parameter value which is representative of the greatest functional likeness in order to propose to replace the failing network element with this determined network element.

The method according to the invention may include additional characteristics considered separately or combined, and notably:

in case where each network element is defined by an ontology representation comprising at least one element property and at least one class specificity one may determine a parameter value from a ratio between a first sum of the number of common class specificities between the failing network element and an other network element with the number of common element properties between the failing network element and this other network element, and a second sum of the number of class specificities of the failing network element with the number of element properties of the failing network element;

in a variant, in case where each network element is defined by an ontology representation comprising at least one element property and at least one class specificity, one may determine a parameter value while taking into account weights associated to the properties and/or the class specificities of the ontology representation of the failing network element and the other network element(s);

one may determine a parameter value from a ratio between a first sum of the weights associated to the class specificities that are common to the failing network element and an other network element and the weights associated to the element properties that are common to the failing network element and this other network element, and a second sum of the weights associated to the class specificities of the failing network element and the weights associated to the element properties of the failing network element.

Figure 2:
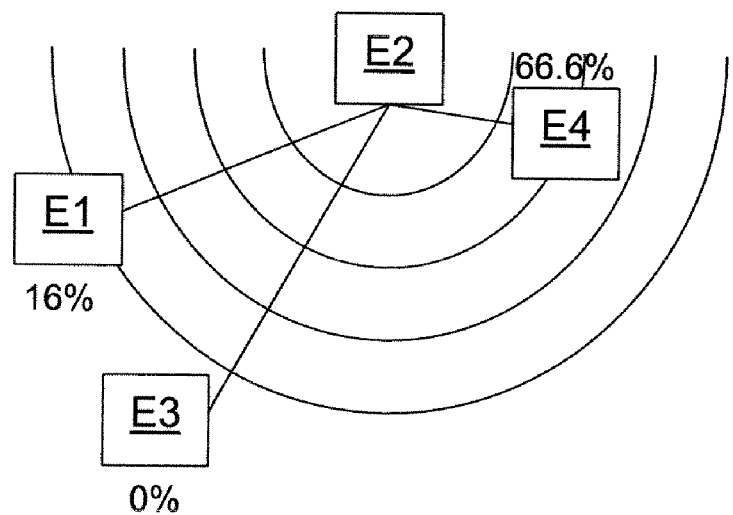

Other features and advantages of the invention will become apparent on examining the detailed specifications and Annex hereafter and the appended drawings, wherein:

FIG. 1 schematically illustrates an example of embodiment of a device according to the invention coupled to a network, and FIG. 2 schematically illustrates an example of "sphere of functional likeness (or proximity)" concerning a failing network element.

The appended drawings may serve not only to complete the invention, but also to contribute to its definition, if need be.

The invention aims at offering a device (D), and the associated method, intended for automatically determining a network element $I_{k'}$ capable of replacing at least one failing network element $I_k$ (with k≠k').

It is important to note that a device (D) according to the invention may be part of, or coupled to, an equipment or an application that is, for instance, intended for managing a network (N). So, such a device (D) can be a computer electronic product that is made of software modules or electronic circuit(s) (or hardware modules) or else a combination of hardware and software modules.

As schematically illustrated in FIG. 1, a device D according to the invention comprises at least an ontology agent OA and a processing module PM.

In the following description an "agent" designates a program which is executed somewhere (for instance in a device D in the case of an ontology agent OA).

The ontology agent OA is arranged for storing at least one ontology O which defines at least representations of elements (or individuals or objects or components) $I_k$ (k>0) of a network N and relations between these network elements $I_k$.

More precisely, according to the W3C ("World Wide Web Consortium") an ontology representation of an element (or individual) $I_k$ of a network N is defined by:

one (and only one) class, which can be either a single named one or a more complex one composed of several relations and which may have one or several specificities, such as restrictions on defined properties or intersection(s) between one restriction and a set of values, one or several element (or individual) properties, and one or several relations with at least one other element (or individual) $I_{k'}$ (k'≠k) of the same network N.

It is important to note that the above mentioned definition is the definition of an element representation of a classical ontology. But the invention also introduces an "enriched" or "augmented" ontology in which an element representation further comprises chosen weights associated to each class specificity) and/or chosen weights associated to each element (or individual) property. This means that in a classical ontology every class specificity weight is equal to 1 and every element property weight is equal to 1.

The invention addressing any type of network element, it addresses any type of ontology that describes in a formal manner terms (or concepts) that are manipulated in any type of domain and the relationships between these terms (or concepts).

For instance the ontology O is written with a chosen ontology language such as OWL ("Ontology Web Language"). But it could be also written with another ontology language such as RDF/XML ("Resource Description Framework/eXtended Markup Language"), for instance. Let us remind that OWL and RDF/XML are two ontology languages that have been developed and standardized by the W3C.

The ontology agent OA may comprise, as illustrated, a storing means for storing at least one ontology O. But the ontology(ies) may be stored into a storing means which is not a part of the ontology agent OA or even of the device D, but to which the ontology agent OA can access. This storing means may be of any type known from the man skilled in the art as soon as it is capable of storing at least one ontology O. So, it can be a database, a flash memory, a ROM, a RAM, a CD ("Compact Disc") or DVD ("Digital Video Disc"), a flat files system, or any other kind of repository, which can be read by the ontology agent OA.

The processing module PM is arranged for intervening when a status of a network element $I_k$ indicates that the latter is failing.

One means here by "status" any type of parameter or variable indicating that a network element $I_k$ is failing (i.e. temporarily broken or unavailable or else impossible to retrieve).

The network element statuses may be stored in a storing means EM which may be part of the device D as illustrated in the non limiting example of FIG. 1. But the network element statuses may be stored into a storing means EM which is not a part of device D, but to which the ontology agent OA can access. This storing means EM may be of any type known from the man skilled in the art as soon as it is capable of storing network element statuses. So, it can be a database, a RAM, a flat files system, or any other kind of repository.

The network element statuses are provided by an interface or network agent SA which is connected (directly or indirectly) to the storing means EM and which may be part of the device D as illustrated in the non limiting example of FIG. 1. But this interface or network agent SA may be external to the device D. Such an interface or network agent SA is arranged for querying the network N in order to get status of its network elements $I_k$.

For instance the interface or network agent SA uses the SNMP protocol to query the network N and constitutes a kind of Management Information Base (or MIB).

For instance, the interface or network agent SA sends (possibly dedicated) messages to network elements $I_k$ (everyone or only some of them) and if it does not receive a response (for instance an acknowledge receipt) from a network element $I_k$ in the 30 seconds following the message transmission, it considers that this network element $I_k$ is failing and therefore associates a "failing status" to this network element $I_k$ that it stores into the storing means EM in correspondence with an identifier of the failing network element $I_k$.

It is important to note that the interface or network agent SA may query the network N either automatically (possibly periodically) or on request (possibly emanating from the processing module PM).

When a failing status relative to a failing network element $I_k$ is stored into the storing means EM, the processing module PM accesses to the ontology agent OA to get the representation of this failing network element $I_k$ and relations between this failing network element $I_k$ and at least one other network element $I_{k'}$ (k'≠k). Then it determines a parameter value for each of these other network elements $I_{k'}$ (i.e. the ones having a relation with the failing network element $I_k$). One means here by "parameter value" a value of a parameter which is representative of a functional likeness (or proximity or else neighbourhood) of a network element (or individual) $I_{k'}$ with the failing network element (or individual) $I_k$.

The processing module PM determines each parameter value from the respective ontology representations of a network element (or individual) $I_{k'}$ and of a failing network element $I_k$.

This determination can be performed according to at least two different manners depending if weights are or are not associated to each class specificity and/or to each element (or individual) property.

A first manner concerns the case where no weight (or a weight equal to 1) is associated to each class specificity and/or to each element (or individual) property. In this case the processing module PM determines a parameter value from a ratio R between a first sum S1 and a second sum S2. In other words R=S1/S2.

The first sum S1 is equal to the number N11 of class specificities that are common both to the failing network element $I_k$ and to an other network element $I_k$ added to the number N12 of element properties that are common both to the failing network element $I_k$ and to this other network element $I_{k'}$. In other words S1=N11+N12.

The second first sum S2 is equal to the number N21 of class specificities of the failing network element $I_k$ added to the number N22 of element properties of the failing network element $I_k$. In other words S1=N21+N22.

So, in the first case the parameter value is the value of the ratio R which is equal to (N11+N12)/(N21+N22).

A second manner concerns the case where a variable weight is associated to each class specificity and/or to each element (or individual) property. In this case the processing module PM determines a parameter value while taking into account the weights that are associated to the properties and/or the class specificities of the ontology representation of the failing network element $I_k$ and the other network element(s) $I_{k'}$.

For instance the processing module PM may determine a parameter value from a ratio R' between a first sum S1' and a second sum S2'. In other words R'=S1'/S2'.

The first sum S1' is equal to the sum of the weights Wjk and Wjk' which are respectively associated to the class specificities that are common both to the failing network element $I_k$ and to an other network element $I_{k'}$ added to the sum of the weights W'ik and W'ik' which are respectively associated to the element (or individual) properties that are common both to the failing network element $I_k$ and to an other network element $I_{k'}$. In other words $$S1' = \sum_j Wjk + Wjk' + \sum_i W'ik + W'ik'.$$

The second sum S2' is equal to the sum of the weights Wnk which are respectively associated to the different class specificities of the failing network element $I_k$ added to the sum of the weights W'mk which are respectively associated to the different element (or individual) properties of the failing network element $I_k$. In other words $$S2' = \sum_n Wnk + \sum_m W'mk.$$

It is important to note that n is an index which designates anyone of the class specificities of the failing network element $I_k$ while j is an index which designates only anyone of the class specificities that are common both to the failing network element $I_k$ and to an other network element $I_{k'}$. In the same way, m is an index which designates anyone of the element (or individual) properties of the failing network element $I_k$ while i is an index which designates only anyone of the element (or individual) properties that are common both to the failing network element $I_k$ and to an other network element $I_{k'}$.

So, in the second case the parameter value is the value of the ratio R' which is equal to $$\left(\sum_j Wjk + Wjk' + \sum_i W'ik + W'ik'\right) \Big/ \left(\sum_n Wnk + \sum_m W'mk\right).$$

It is important to note that the weights that are used during the determination of a parameter value may be either known by the processing module PM (for instance through a correspondence table) or included into the ontology representation of the concerned elements (or individuals) $I_k$ and $I_{k'}$ (in case of an augmented (or enriched) ontology O).

A more formal (i.e. mathematics) representation of an example of determination of parameter values is given in the Annex. In this non limiting example the considered element (or individual) is a white wine called "Selaks Sauvignon blanc".

Once the processing module PM has determined the parameter values of different pairs of network elements (or individuals) ($I_{k'}$, $I_k$), it determines amongst the (other) network elements $I_{k'}$ of the pairs ($I_{k'}$, $I_k$) the one which offers the parameter value which is representative of the greatest functional likeness (or proximity). Then, once the processing module PM has determined such a network element $I_{k'}$, it delivers a message PE on an output, which proposes to replace the failing network element $I_k$ with this determined network element $I_{k'}$.

As illustrated in the non limiting example of FIG. 1, this message PE can be provided to the interface or network agent SA, in order it could be locally processed or transmitted to a chosen network management equipment of the network N. A failing network element $I_k$ may be replaced with one or several determined network elements $I_{k'}$ either automatically or upon reception of an authorization emanating from a network manager.

It is important to note that when one or several determined network elements $I_{k'}$ replace effectively a failing network element $I_k$, each time a third party (program) wants to use this failing network element $I_k$ the network N automatically reroutes it near one of the determined network elements $I_{k'}$.

Two non limiting examples of determination of parameter values for network elements (or individuals) $I_k$ constituting printers are given hereafter. These two examples respectively correspond to the first (without weight) and second (with weights) cases described above.

Let us assume that:
a first printer $I_1$ is associated to an ontology representation comprising:
  two class specificities (here two class restrictions on the property "type of printer"):
    Type of consumer: business (weight=0.5)
    Black Laser (weight=2)
  three element (or individual) properties:
    Black resolution: >600*600 dpi (weight=2)
    Print memory: 8 MB (weight=2)
    Processor: 266 MHz (weight=2)

a second printer $I_2$ is associated to an ontology representation comprising:
  two class specificities (here two class restrictions):
    Type of consumer: business (weight=0.5)
    Color Inkjet (weight=2)>
  four element (or individual) properties:
    Color resolution: >28 ppm (weight=2)
    Black resolution: >22 ppm (weight=2)
    Paper input capacity: >100 sheets (weight=0.5)
    Paper trays: >3 (weight=0.5)

a third printer $I_3$ is associated to an ontology representation comprising:
  two class specificities (here two class restrictions):
    Type of consumer: home & home office (weight=0.5)
    For photo only (weight=2)>
  three element (or individual) properties:
    Fix red eye (weight=2)
    One button printing (weight=0.5)
    Photo print resolution: >4800*1200 dpi (weight=2)

a fourth printer $I_4$ is associated to an ontology representation comprising:
  two class specificities (here two class restrictions):
    Type of consumer: business (weight=0.5)
    Multifunction (weight=2)>
  five element (or individual) properties:
    Color resolution: >28 ppm (weight=2)
    Black resolution: >22 ppm (weight=2)
    Scanner type: Flatbed (weight=2)
    Paper input capacity: >100 sheets (weight=0.5)
    Paper trays: =1 (weight=0.5).

Then if the failing printer is the second one $I_2$ and if one uses the first ratio R (R=S1/S2; first case without weight), one gets:

$R(I_2,I_1)=(1+0)/(2+4)=0.16=16\%,$ $R(I_2,I_3)=(0+0)/(2+4)=0=0\%,$ $R(I_2,I_4)=(1+3)/(2+4)=0.66=66.6\%.$

These three parameter values R may be seen as three points of a "sphere of functional likeness (or proximity)" for the failing second printer $I_2$. An example of such a sphere is illustrated in FIG. 2.

In this first case the printer offering the greatest functional likeness (or proximity) R is the fourth one $I_4$ (66.6%). So, the processing module PM will deliver a message PE proposing to replace the failing second printer $I_2$ with the fourth printer $I_4$.

Now, if the failing printer is the second one $I_2$ and if one uses the second ratio R' (R'=S1'/S2'; second case with weights), one gets:

$R'(I_2,I_1)=(0.5+0)/(2.5+5)=0.06=6\%,$ $R'(I_2,I_3)=(0+0)/(2.5+5)=0=0\%,$ $R'(I_2,I_4)=(0.5+4.5)/(2.5+5)=0.83=83\%.$

In this second case the printer offering the greatest functional likeness (or proximity) R' is still the fourth one $I_4$ (83%). So, the processing module PM will also deliver a message PE proposing to replace the failing second printer $I_2$ with the fourth printer $I_4$.

The invention can also be considered in terms of a method for automatically determining an element $I_{k'}$ of a network N capable of replacing at least one failing network element $I_k$ (with k≠k') of this network N.

Such a method may be implemented by means of a device D such as the one above described with reference to FIG. 1. Therefore, only its main characteristics will be mentioned hereafter.

The method according to the invention consists, when a status of a network element $I_k$ indicates that the latter ($I_k$) is failing:

i) in determining, into an ontology O defining representations of the network elements $I_k$ and relations between these network elements, the representation of the failing network element $I_k$ and the relations between this failing network element $I_k$ and at least one other network element $I_{k'}$ (with k'≠k), then ii) in determining for each of these other network elements $I_{k'}$ a parameter value representative of a functional likeness with the failing network element $I_k$ from their respective ontology representations, and iii) in determining amongst the other network elements $I_{k'}$ the one offering the parameter value representative of the greatest functional likeness in order to propose to replace the failing network element $I_{k'}$ with this determined network element.

The invention allows to make not only dynamic reconfigurations of a network but also dynamic network element gatherings into a network.

The invention is not limited to the embodiments of method and device described above, only as examples, but it encompasses all alternative embodiments which may be considered by one skilled in the art within the scope of the claims hereafter.

ANNEX

One considers hereafter an element (or individual) which is a white wine called "Selaks Sauvignon blanc". This white wine belongs to a class called "Sauvignon blanc" and its ontology representation is part of the wine ontology which is defined by the W3C (see for instance the Internet address "http://www.w3.org/TR/2004/REC-owl-guide-20040210/wine.rdf"). The set of individual (or element) properties (locatedIn, hasMaker, hasSugar, hasFlavor and hasBoby), which defines partly the ontology representation of the Selaks Sauvignon Blanc, is given hereafter:

```
<SauvignonBlanc rdf:ID="SelaksSauvignonBlanc">
    <locatedIn rdf:resource="#NewZealandRegion" />
    <hasMaker rdf:resource="#Selaks" />
    <hasSugar rdf:resource="#Dry" />
    <hasFlavor rdf:resource="#Moderate" />
    <hasBody rdf:resource="#Medium" />
</SauvignonBlanc>
```

Association of Weights

In order to allow to determine what is the most pertinent information for a wine one may associate chosen weights to at least one of these individual (or element) properties and/or to at least one specificity of the Sauvignon blanc class as mentioned as example hereafter:

```
<owl:ObjectProperty rdf:ID="locatedIn" rdf-ext:weight="0.1">
    <rdf:type rdf:resource="&owl;TransitiveProperty" />
    <rdfs:domain...rdf:resource="http://www.w3.org/2002/07/owl#Thing" />
    <rdfs:range rdf:resource="#Region" />
</owl:ObjectProperty>
<owl:ObjectProperty rdf:ID="hasFlavor" rdf-ext:weight="1">
    <rdf:type rdf:resource="&owl;FunctionalProperty" />
    <rdfs:subPropertyOf rdf:resource="#hasWineDescriptor" />
    <rdfs:range rdf:resource="#WineFlavor" />
```

-continued

```
</owl:ObjectProperty>
<owl:ObjectProperty rdf:ID="hasBody" rdf-ext:weight="1">
    <rdf:type rdf:resource="&owl;FunctionalProperty" />
    <rdfs:subPropertyOf rdf:resource="#hasWineDescriptor" />
    <rdfs:range rdf:resource="#WineBody" />
</owl:ObjectProperty>
<owl:Class rdf:ID="SauvignonBlanc">
    <owl:intersectionOf rdf:parseType="Collection" rdf-...
    ...ext:weight="5">
        <owl:Class rdf:about="#SemillonOrSauvignonBlanc" />
        <owl:Restriction rdf-ext:weight="5">
            <owl:onProperty rdf:resource="#madeFromGrape" />
            <owl:hasValue rdf:resource="#SauvignonBlancGrape" />
        </owl:Restriction>
        <owl:Restriction rdf-ext:weight="3">
            <owl:onProperty rdf:resource="#madeFromGrape" />
            <owl:maxCardinalityrdf:datatype="&xsd;...
            ...nonNegativeInteger">1</owl:maxCardinality>
        </owl:Restriction>
    </owl:intersectionOf>
</owl:Class>
```

In this non limiting example class specificities have more important associated weights than those associated to the element (or individual) properties in order to privilege them.

Determination of the Functional Likeness (or Proximity or Else Neighbourhood)

In the following one will make use of variables whose definitions are given hereafter:

$I_k$ designates an individual (or element)

$C_k$ designates a class $P_k$ designates a property $C(I_k)$ designates the class of an individual $I_k$ $CS_i(C(I_k))$ designates a class specificity "i" of the individual class $I_k$ $P_i(I_k)$ designates a property "i" of an individual "$I_k$"

$\Omega_i(I_k)$ designates the weight associated to the class specificity $CS_i(C(I_k))$ $\omega_i(I_k)$ designates the weight associated to the individual property $P_i(I_k)$ $$\bigcap(x, y) = \begin{cases} 1 & \text{if } x = y \\ 0 & \text{if not} \end{cases} \text{ defines the relation between } x \text{ and } y$$

$\Psi(A,B)$ designates the functional likeness (or proximity) between A and B

In the following one will also make use of the following criteria:

two class specificities of the same class are always distinct, two properties of the same element (or individual) are always distinct, all the classes are distinct one from the other, all element (or individual) properties are distinct one from the other.

These criteria may be mathematically defined by the following formula, taking into account the variable definitions given above:

$$\forall (i,j,k) \in N^3, i \neq j \Rightarrow CS_i(C(I_k)) \neq CS_j(C(I_k))$$

$$\forall (i,j,k) \in N^3, i \neq j \Rightarrow CS_i(C_k) \neq CS_j(C_k)$$

$$\forall (i,j,k) \in N^3, i \neq j \Rightarrow P_i(I_k) \neq P_j(I_k)$$

$$\forall (i,j) \in N^2, i \neq j \Rightarrow P_i \neq P_j$$

$$\forall (i,j) \in N^2, i \neq j \Rightarrow C_i \neq C_j$$

If one assumes that an element (or individual) ontology representation is defined by:
- one (and only one) class. This class can be either a single named one or a more complex one composed of several relations. Moreover this class may have one or several specificities (such as restrictions or intersections, for instance), each having a chosen weight in case of an "augmented ontology" (in a classical ontology every class specificity weight is equal to 1),
- one or several element (or individual) properties, each having a chosen weight in case of an "augmented ontology" (in a classical ontology every element property weight is equal to 1), and
- one or several relations with at least one other element (or individual), then the functional likeness (or proximity or else neighbourhood) between a failing element (or individual) $I_k$ and an other element (or individual) $I_l$ may be defined by the following formula:

$$\Psi(I_k, I_l) = \frac{\sum_{i=1...p}\left(\Omega_i(I_k) \times \sum_{j=1...q} \bigcap (CS_i(C(I_k)), CS_j(C(I_l)))\right) + \sum_{i=1...p}\left(\omega_i(I_k) \times \sum_{j=1...q} \bigcap (P_i(I_k), P_j(I_l))\right)}{\sum_{i=1...p}\Omega_i(I_k) + \sum_{i=1...p}\omega_i(I_k)}$$

and the functional likeness (or proximity or else neighbourhood) between two ontology classes may be defined by the following formula:

$$\Psi(C_k, C_l) = \frac{\sum_{i=1...p}\left(\Omega_i(C_k) \times \sum_{j=1...q} \bigcap (CS_i(C_k), CS_j(C_l))\right)}{\sum_{i=1...p}\Omega_i(C_k)}.$$

It is also possible to build a formula defining the functional likeness (or proximity or else neighbourhood) between one element (or individual) and a set of other elements (or individuals). Such a formula can be notably used in case where a set of elements (or individuals) must be replace with an element (or object). If one takes into account the fact that the proximity between an element (or individual) and another element (or individual) is close to zero when these elements (or individuals) have nothing in common, then this formula can be expressed as the following product:

$$\Psi(I, \{I_1, I_2, \ldots, I_n\}) = \prod_{i=1}^{i=n} \Psi(I, I_i),$$

and the functional likeness (or proximity or else neighbourhood) between one class and a set of classes may be defined by the following product:

$$\Psi(C, \{C_1, C_2, \ldots, C_n\}) = \prod_{i=1}^{i=n} \Psi(C, C_i).$$

A non limiting example of program allowing to determine the functional likeness (or proximity or else neighbourhood) between one element (or individual) and a set of at least one other element (or individual) is given hereafter. Such a program can be easily transposed to the case of classes.

```
// declare program variables
Neighbor = {Individual, Proximity};
Neighbourhood = {Individual, MapOf(Neighbor)};
Neighbourhoods = MapOf(Neighbourhood);
// init program variables
Neighbourhoods Ns = CreateEmptyNeighbourhoods( );
// main function
Work(Ontology O)
{
    // iterate
    Foreach (Element e1 of type Individual in Ontology)
    {
        Neighbourhood Ne1 = CreateEmptyNeighbourhood( );
        // Now take each element but e1 and compare to e1
        Foreach (Element e2 of type Individual in Ontology
        and e2 ≠e1)
        {
            D = GetProximity(e1,e2);
            If (D > 0)
            {
                Neighbor N = Neighbor {e2, D};
                AddInNeighbourhood(Ne1,N);
            }
        }
    AddInNeighbourhoods(Ns, Ne1);
    }
}
// Only one interesting function to express
GetProximity(Individual i1, Individual i2)
{
    Properties P1 = GetPropertiesFromClassicalReasoner
    (e1);
    Class C1 = GetClassFromClassicalReasoner (e1);
    ClassRelations CR1 =...
    ...GetClassSpecificitiesFromClassicalReasoner(C1);
    Properties P2 = GetPropertiesFromClassicalReasoner
    (e2);
    Class C2 = GetClassFromClassicalReasoner (e2);
    ClassRelations CR2 =...
    ...GetClassSpecificitiesFromClassicalReasoner(C2);
    Int Proximity = 0;
    Int N = 0;
    Int D = 0 ;
    Foreach (element cr1 in CR1)
    {
        Foreach(element cr2 in CR2)
        {
            if
            (GetEquivalenceFromClassicalReasoner(cr1,cr2
            )
            {
                N += GetWeight(cr1); // with classical
                ontology the value is equal to '1'
            }
            D += GetWeight(cr1);
        }
    }
    Foreach (element p1 in P1)
    {
        Foreach(element p2 in P2)
        {
            if
            (GetEquivalenceFromClassicalReasoner(p1,p2)
            {
                N += GetWeight(p1); // with classical
                ontology the value is equal to '1'
            }
            D += GetWeight(p1);
        }
    }
```

```
        if (D > 0)
            Proximity = N/D;
        else
            Proximity = 0 ;
    Return Proximity ;
}
```

The invention claimed is:

1. Device (D) for at least one network (N) comprising elements, wherein the device comprises hardware or hardware and software arranged as i) an ontology agent (OA) storing at least one ontology defining representations of said network elements and relations between said network elements, and ii) a processing means (PM) arranged, when a status of a network element indicates that the latter is failing, for accessing to said ontology agent (OA) to get the representation of said failing network element and relations between said failing network element and at least one other network element, then for calculating for each of said other network elements a parameter value representative of a functional likeness with said failing network element from their respective ontology representations, and for determining amongst said other network elements the one offering the parameter value representative of the greatest functional likeness in order to propose to replace said failing network element with said determined network element.

2. Device according to claim 1, wherein said processing means (PM) is arranged, in case where each network element is defined by an ontology representation comprising at least one element property, characterizing said network element, and at least one class specificity, characterizing at least partly a class to which belongs said network element, for determining a parameter value from a ratio between a first sum of the number of common class specificities between said failing network element and an other network element with the number of common element properties between said failing network element and said other network element, and a second sum of the number of class specificities of said failing network element with the number of element properties of said failing network element.

3. Device according to claim 1, wherein said processing means (PM) is arranged, in case where each network element is defined by an ontology representation comprising at least one element property, characterizing said network element, and at least one class specificity, characterizing at least partly a class to which belongs said network element, for determining a parameter value while taking into account weights associated to the properties and/or the class specificities of the ontology representation of said failing network element and said other network element(s).

4. Device according to claim 3, wherein said processing means (PM) is arranged for determining a parameter value from a ratio between a first sum of the weights associated to the class specificities that are common to said failing network element and an other network element and the weights associated to the element properties that are common to said failing network element and said other network element, and a second sum of the weights associated to the class specificities of said failing network element and the weights associated to the element properties of said failing network element.

5. Device according to claim 1 wherein it said device comprises an interface (SA) arranged for querying said network in order to get status of its network elements of the network.

6. A computer software product provided on a non-transitory computer readable medium, the computer software product comprising instructions for a processor of a device according to claim 1 for implementing the functions of the device.

7. Method for automatically determining an element of a network (N) capable of replacing at least one failing network element of said network (N), wherein said method comprises: when a status of a network element indicates that the latter is failing, i) determining, into an ontology defining representations of said network elements and relations between said network elements, the representation of said failing network element and relations between said failing network element and at least one other network element, then ii) calculating, for each of said other network elements, a parameter value representative of a functional likeness with said failing network element from their respective ontology representations, and iii) in determining amongst said other network elements the one offering the parameter value representative of the greatest functional likeness in order to propose to replace said failing network element with said determined network element.

8. Method according to claim 7, wherein, in case where each network element is defined by an ontology representation comprising at least one element property, characterizing said network element, and at least one class specificity, characterizing at least partly a class to which belongs said network element, one determines a parameter value from a ratio between a first sum of the number of common class specificities between said failing network element and an other network element with the number of common element properties between said failing network element and said other network element, and a second sum of the number of class specificities of said failing network element with the number of element properties of said failing network element.

9. Method according to claim 7, wherein, in case where each network element is defined by an ontology representation comprising at least one element property, characterizing said network element, and at least one class specificity, characterizing at least partly a class to which belongs said network element, one determines a parameter value while taking into account weights associated to the properties and/or the class specificities of the ontology representation of said failing network element and said other network element(s).

10. Method according to claim 9, wherein one determines a parameter value from a ratio between a first sum of the weights associated to the class specificities that are common to said failing network element and an other network element and the weights associated to the element properties that are common to said failing network element and said other network element, and a second sum of the weights associated to the class specificities of said failing network element and the weights associated to the element properties of said failing network element.

11. Device of claim 1 wherein each calculated parameter value is calculated based on weights associated with class specificities of said failing network element characterizing, at least partly, a class to which said network element belongs, and weights associated with element properties of said failing network element characterizing said network element, on weights associated with class specificities that are common to said failing network element and another network element, and on weights associated with element properties that are common to said failing network element and said other network element.

* * * * *